United States Patent [19]

Tamura et al.

[11] Patent Number: 5,354,590
[45] Date of Patent: Oct. 11, 1994

[54] OPTICAL RECORDING MEDIUM

[75] Inventors: Miki Tamura; Tsuyoshi Santoh, both of Yokohama, Japan

[73] Assignee: Canon Kabushiki Kaisha, Tokyo, Japan

[21] Appl. No.: 835,343

[22] Filed: Feb. 14, 1992

[30] Foreign Application Priority Data

Feb. 16, 1991 [JP] Japan .................. 3-042447
Mar. 28, 1991 [JP] Japan .................. 3-087392

[51] Int. Cl.$^5$ .......................... B32B 3/00
[52] U.S. Cl. ............................ 428/64; 428/65; 428/413; 428/913; 430/945; 346/76 L; 346/135.1
[58] Field of Search .............. 428/64, 65, 413, 913; 430/945; 346/76 L, 135.1; 369/288

[56] References Cited

U.S. PATENT DOCUMENTS

| | | | |
|---|---|---|---|
| 4,315,269 | 2/1982 | Bloom et al. | 346/135.1 |
| 4,892,606 | 1/1990 | Miyazaki et al. | 156/275.5 |
| 4,921,780 | 5/1990 | Oguchi et al. | 430/495 |
| 4,931,337 | 6/1990 | Miyazaki et al. | 428/64 |
| 4,944,981 | 7/1990 | Oguchi et al. | 428/64 |
| 4,965,178 | 10/1990 | Santoh et al. | 430/495 |
| 5,009,987 | 4/1991 | Mihara et al. | 430/495 |
| 5,024,917 | 6/1991 | Mihara et al. | 430/271 |

FOREIGN PATENT DOCUMENTS

| | | |
|---|---|---|
| 828670 | 9/1975 | Belgium . |
| 0278763 | 8/1988 | European Pat. Off. . |
| 0404951 | 1/1991 | European Pat. Off. . |
| 52-14277 | 4/1977 | Japan . |
| 52-14278 | 4/1977 | Japan . |
| 52-14279 | 4/1977 | Japan . |
| 57-070694 | 5/1982 | Japan . |
| 58-125248 | 7/1983 | Japan . |
| 58-203095 | 11/1983 | Japan . |
| 60-117430 | 6/1985 | Japan . |
| 61-137243 | 6/1986 | Japan . |
| 62-283121 | 12/1987 | Japan . |
| 63-2223 | 1/1988 | Japan . |
| 63-42333 | 8/1988 | Japan . |
| 2067179 | 3/1990 | Japan . |
| 2121133 | 5/1990 | Japan . |

OTHER PUBLICATIONS

S. I. Schlesinger, Photopolymerization of Epoxides, vol. 18, No. 4, Photographic Science and Engineering, pp. 387-393 (Jul./Aug. 1974).

J. V. Crivello and J. H. W. Lam, Diaryliodonium Salts, A New Class of Photoinitiators for Cationic Polymerization, vol. 10, No. 6, Macromolecules, pp. 1307-1315 (Nov./Dec. 1877).

*Primary Examiner*—Patrick J. Ryan
*Assistant Examiner*—Elizabeth Evans
*Attorney, Agent, or Firm*—Fitzpatrick, Cella, Harper & Scinto

[57] ABSTRACT

The present invention provides an optical recording medium having on a substrate a recording layer containing an organic coloring matter and a record-assisting layer which is formed out of an elastic polymer cured by a radical reaction. So that radicals generated in the record-assisting layer may be inactivated, a radical scavenger is given to the recording layer, or a radical-scavenging layer is provided between the recording layer and the record-assisting layer.

17 Claims, 1 Drawing Sheet

OPTICAL RECORDING MEDIUM

BACKGROUND OF THE INVENTION

1. Field of the Invention

The present invention relates to an optical recording medium for optically recording and reproducing information.

2. Related Background Art

Magnetic materials are generally used for conventional recording mediums such as credit cards, floppy disks, and the like. These recording mediums are advantageous in that writing and reading of information can readily be performed, but have problems that the recorded matters can readily be altered and high density recording is not achievable. As means of solving such problems and treating a variety of information efficiently, optical information recording methods were proposed which utilize an optical recording medium, and various proposals therefor have been made regarding the recording mediums, recording-reproducing systems, recording-reproducing apparatuses, and the like.

The optical recording mediums for optical recording and reproduction of information includes those which comprise silver particles dispersed in a gelatin matrix.

Furthermore, a heat-mode recording medium was disclosed in which recording is conducted by projecting a spot-like energy beam such as a laser beam onto the recording layer thereof to change the state of portions of the recording layer. Such a recording medium does not require a developing treatment, allowing direct reading after writing (called a DRAW medium), and enabling high-density recording and additional recording, and is considered to be promising as recording mediums for disks and cards.

Organic coloring matters which change their properties by receiving a relatively long wavelength of light are studied comprehensively for use in optical disks and optical cards, because the organic coloring matters are nontoxic and capable of being formed into a film by a coating method at a lower production cost.

Generally, optical disks have an air gap structure in which a void space is formed at the upper portion of the recording layer to raise recording sensitivity. The formation of the void space in the upper portion of the recording medium facilitates the change of the state of the recording layer to achieve high sensitivity. The optical cards, however, are frequently carried and used in the same manner as in cash cards and credit cards. Therefore, strength against distortion caused by various external forces is necessary. In addition, there is a desire of making the medium thin. Such facts refuse the employ the air gap structure; instead contact-layer structures are generally employed.

Optical disks are preferable to minimize its thickness in view of carriage and storage. As far as the thickness is minimized, the optical disks are also desired to have a contact-layer structure. However, the optical disks having a contact-layer structure disadvantageously exhibit lower recording sensitivity in comparison with the one having the hollow structure.

On the other hand, the formation of a layer of an elastic rubber polymer such as urethane rubber, silicone rubber, and fluororubber on the recording layer was disclosed to improve the recording sensitivity, for example, in Japanese Patent Publication No. 63-42333, and Japanese Patent Application Laid-Open Nos. 58-125248 and 58-203095.

Further, formation of a thermoplastic soft layer of such material as a styrene-butadiene copolymer, a nylon resin, and a polyvinylbutyral resin was disclosed in Japanese Utility Model Application Laid-Open No. 63-2223 to improve the recording sensitivity.

As mentioned above, a record-assisting layer provided on the recording layer is known to improve the recording sensitivity. The material for constituting the record-assisting layer is desired to be capable of forming a film by a coating method on the recording layer without dissolving the recording layer. In the case where the recording layer contains an organic coloring matter, the preferred material for the record-assisting layer includes curable rubber type polymer which exhibits rubber elasticity after curing: for example, silicone rubber, diene type liquid rubber, and the like.

The curable rubber polymers are classified into a room-temperature-curable type, a heat-curable type, and a UV- or electron-ray-curable type. Of these types, the UV- or electron-ray curable type of rubber can be cured in an extremely short time of from several seconds to several minutes, and exhibits significantly high productivity.

The UV- or electron-ray curable type of rubber polymer undergoes generally the cure reaction in a radical chain reaction caused by a radical formed by irradiation of a UV ray or an electron ray. Therefore, such problem is involved that a part of the radicals generated in the cure reaction will react with the organic coloring matter in the recording layer to deteriorate the recording layer.

SUMMARY OF THE INVENTION

The present invention intends to provide an optical recording medium having a contact-layer structure, yet having a high sensitivity of the recording layer and producible in high productivity.

The present invention provides an optical recording medium having a substrate, a recording layer containing an organic coloring matter, and a record-assisting layer, the record-assisting layer being formed out of elastic polymer cured by a radical reaction, and the recording layer containing a radical scavenging compound to inactivate radicals generated in the record-assisting layer.

The present invention further provides an optical recording medium having a substrate, a recording layer containing an organic coloring matter, and a record-assisting layer, the record-assisting layer being formed out of an elastic polymer cured by a radical reaction, and a scavenging layer containing a radical scavenger being provided between the recording layer and the record-assisting layer.

The present invention still further provides an optical recording medium having a substrate, a recording layer containing an organic coloring matter, and a record-assisting layer, the record-assisting layer being formed out of an elastic polymer prepared by polymerization of an epoxy-group-containing polymerizable compound with an ionic polymerization initiator.

DESCRIPTION OF THE PREFERRED EMBODIMENT

The recording medium of the present invention comprises on a substrate a recording layer, a record-assisting layer and, optionally, a protecting layer, in this order from the substrate.

The optical record-assisting layer in the recording medium of the present invention is composed of an elastic polymer cured by irradiation of a UV ray or an electron ray. In one aspect of the present invention, the optical recording medium contains a radical scavenger which scavenges the radicals generated on curing the polymerizable component to prevent deterioration of the recording layer from being caused by the radicals. In another aspect of the present invention, the record-assisting layer is composed of an elastic polymer cured by ionic polymerization reaction to prevent the sensitivity of the recording layer from lowering.

The present invention is described below with reference to the drawings.

Figure 1:
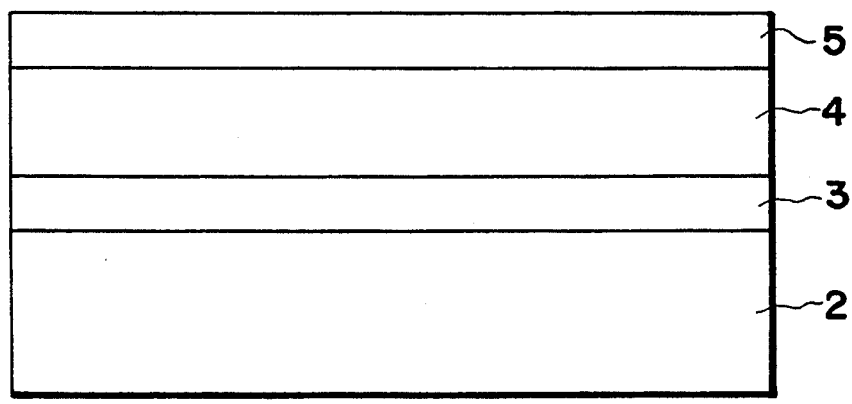
FIG. 1 is a side view of an example of an optical recording medium of the present invention.

The optical recording medium of the present invention comprises, as illustrated in FIG. 1, a substrate 2, a recording medium 3, a record-assisting layer 4, and optionally a protecting layer 5.

The record-assisting layer 4 is formed out of a high-molecular compound having rubber elasticity (hereinafter referred to as an elastic polymer), providing the recording medium with the contact-layer structure. The elastic polymer is formed by curing a polymerizable component with a UV ray OF an electron ray. The term "polymerizable component" herein means a compound which gives a polymer by polymerization or crosslinking.

The elastic polymer employed for forming the record-assisting layer 4 includes, for example, silicone rubbers which are curable according to the mechanisms shown by the formulas (1) to (3).

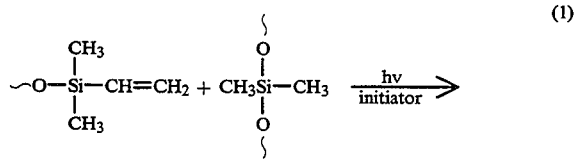

(1)

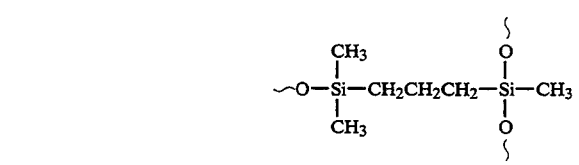

(2)

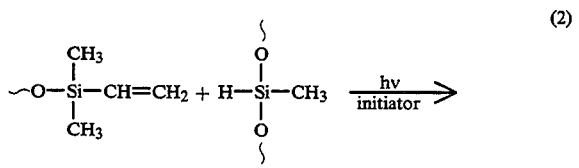

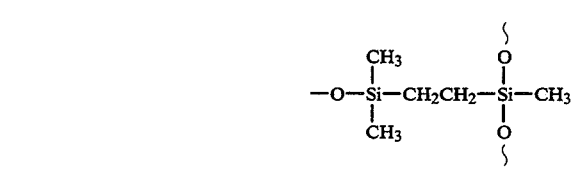

(3)

(wherein "n" is an integer)

Further, the elastic polymer employed for forming the record-assisting layer 4 includes diene type liquid rubbers having a vinyl group in the molecular chain or at the end thereof, for example, as shown in the formula (4).

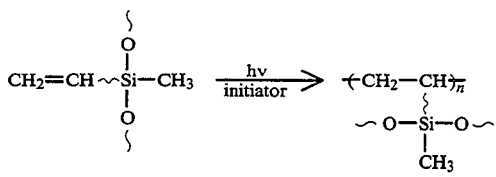

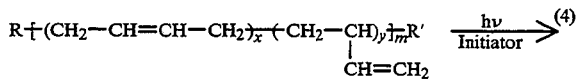

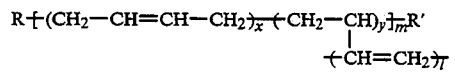

wherein x+y=1; R and R' are independently a group such as —COOH, OH, or —CH=CH$_2$; and l and m are each an integer.

The formulas (1) to (4) exemplify the elastic polymers used for forming the record-assisting layer 4. The record-assisting layer 4 has preferably a hardness after cure in the range of from 2 to 70, more preferably from 3 to 60 according to JIS-K 6301 (or ASTM D2240), while the preferred polymerization degree or molecular weight cannot readily be shown.

The radical polymerization initiator, which is employed optionally in curing the polymerizable component, includes usual radical polymerization initiators such as acetophenones, e.g., dichloroacetophenone, trichloroacetopheneone, dialkoxyacetophenone, etc; benzophenone, Michler's ketone, benzylbenzoyl, benzoin ether, benzyldimetylketal, benzoyl benzoate, α-acyloxime esters, and the like. The polymerization initiator is used preferably in an amount of from 5/1000 to 5/100 by weight of the polymerizable component The recording layer 3 contains an organic coloring matter and a radical scavenger.

The organic coloring matter includes cyanines, merocyanines, polymethines, phthalocyanines, naphthalocyanines, tetrahydrocholines, dioxazines, pyryliums, azulenes, anthraquinones, and the like. Of these organic coloring matters, cyanines, merocyanines, polymethines, azulenes, phthalocyanines, and naphthalocyanines are highly effective in maintaining the recording sensivity of the recording layer 3 in combination with the record-assisting layer 4 composed of an elastic polymer.

The effective radical scavenger, which reacts readily with a radical to inhibit the progress of a radical chain reaction, includes phenols, quinones, amines, and the like. The phenols includes
2,6-di-t-butyl-p-cresol, butylated hydroxyanisole,
2,6-di-t-butyl-4-ethylphenol,
stearyl-β-(3,5-di-t-butyl-4-hydroxyphenyl) propionate,
2,2'-methylene-bis-(4-methyl-6-t-butylphenol),
2,2'-methylene-bis-(4-ethyl-6-t-butylphenol),
4,4'-thiobis-(3-methyl-6-t-butylphenol),
4,4'-butylidene-bis-(3-methyl-6-t-butylphenol), 1,1,3-tris-(2-methyl-4-hydroxy-5-t-butylphenyl)butane,
1,3,5-trimethyl-2,4,6-tris(3,5-di-t-butyl-4-hydroxybenzyl)benzene,
tetrakis-[methylene-3-(3',5'-di-t-butyl-4'-hydroxphenyl)propionate]methane,
bis-[3,3'-bis-(4'-hydroxy-3'-t-butylphenyl)butyric acid] glycol ester,
tocopherol, and the like.

The quinones include hydroquinone, hydroquinone monomethyl ether, hydroxyhydroquinone, p-benzoquinone, and the like. The amines include N,N-diphenyl-p-phenylenediamine, N,N-di-$\beta$-naphthyl-p-phenylenediamine, phenyl-isopropyl-p-phenylenediamine, N-phenyl-N'-(1-methylheptyl)-p-phenylenediamine, and hindered amines. Of these compounds, particularly preferred are phenols as the radical scavenger in view of the low interaction thereof with the organic coloring matter forming the recording layer. The radical scavenger, however, is not limited to these compounds in the present invention.

The organic coloring matter is contained preferably in an amount of from 60 to 99.95%, more preferably from 70 to 99.0% by weight based on the recording layer 3. (Hereinafter the percentage is based on weight).

The radical scavenger is contained preferably in a weight ratio to the organic coloring matter of from 5/10000 to 40/100, more preferably from 1/1000 to 30/100. If the content of the radical scavenger is less than 5/10000, the radical scavenging effect is low, while if the content is higher than 40/100, it causes lower reflectance, lower recording sensitivity, or retardation of curing of the record-assisting layer.

The radical scavenging compound may be dispersed uniformly in the recording layer 3. Preferably, however, the radical scavenging compound is distributed at a higher concentration at the side of the record-assisting layer 4 than at the side of the substrate 2 in the recording layer 3 to scavenge radicals effectively. Such a nonuniform distribution of the concentration decreases the required amount of the radical scavenging compound, thereby preventing the decrease of the reflectivity of the recording layer 3. With the nonuniform concentration distribution of the radical scavenging compound, the content thereof is preferably in a ratio of from 5/10000 to 20/100, more preferably from 5/10000 to 10/100 by weight to the organic coloring matter.

Furthermore, the nonuniform concentration distribution of the radical scavenging compound strengthens the contact bonding of the recording layer 3 to the record-assisting layer 4 in the case where the radical scavenging compound has a group like an —OH group, an —NH$_2$ group, or a >C=O group.

In one method of giving the nonuniform concentration distribution of the radical scavenging compound, the record-assisting layer 4 is applied on the recording layer 3 and then the recording layer 3 is heated from the side of the substrate 2 at a temperature of from 70° to 140° C. prior to the curing. Thereby, the radical-scavenging compound migrates to the side of the record-assisting layer by heating because the radical-scavenging compound is more sublimable than the organic coloring matter.

The recording layer 3 may contain optionally a stabilizing agent. This stabilizing agent includes metal chelate compound, particularly those which have a central metal such as Zn, Cu, Ni, Cr, Co, Mn, Pd, and Zr, and a multidentate ligand such as tetradentate ligands, e.g., N$_4$, N$_2$O$_2$, N$_2$S$_2$O$_4$, O$_2$S$_2$, and O$_4$, etc. or their combinations; aromatic amines and diamines; nitrogen-containing aromatic compounds and onium salts thereof such as aminium salts, diimmonium salts, pyridinium salts, imidazolinium salts, and quinolium salts. Pyrylium salts which are salts of oxygen-containing aromatic compound are also useful. The stabilizing agent may be used singly OF in combination of two or more thereof. The stabilizing agent is contained preferably in a ratio of from 1/100 to 50/100, more preferably from 10/100 to 40/100 by weight to the organic coloring matter.

The optical recording medium described above contains a radical-scavenging compound in the recording layer 3. In another embodiment, the radical-scavenging compound is not contained in the recording layer 3, and instead, a scavenging layer 1 which contains the radical-scavenging compound is provided between the recording layer 3 and the record-assisting layer 4 as illustrated in FIG. 2.

The scavenging layer 1, which may be formed exclusively out of a radical-scavenging compound, is preferably composed of the radical-scavenging compound and a binder. In this case, the radical-scavenging compound is contained preferably in an amount of from 0.05 to 10%, more preferably from 0.1 to 5% in the scavenging layer 1.

The binder to be contained in the scavenging layer 1 includes polymethyl methacrylates, polystyrenes, polyesters, polyurethanes, ethylene-vinyl chloride copolymers, polyvinylidene chlorides, polyvinyl chlorides, polybutadienes, polyacetals, polyamides, polyimides, polyamidoimides, polyethylenes, polyethylene terephthalates, polycarbonates, polysulfones, polyvinyl alcohols, polyvinyl ethers, polyvinylbutyrals, polybutylene terephthalates, polypropylenes, nitrocelluloses, cellulose acetates, ethylcelluloses, polyvinyl acetates, ethylene-vinyl acetate copolymers, and vinyl chloride-vinyl acetate copolymers, and combinations of two or more thereof.

Figure 2:
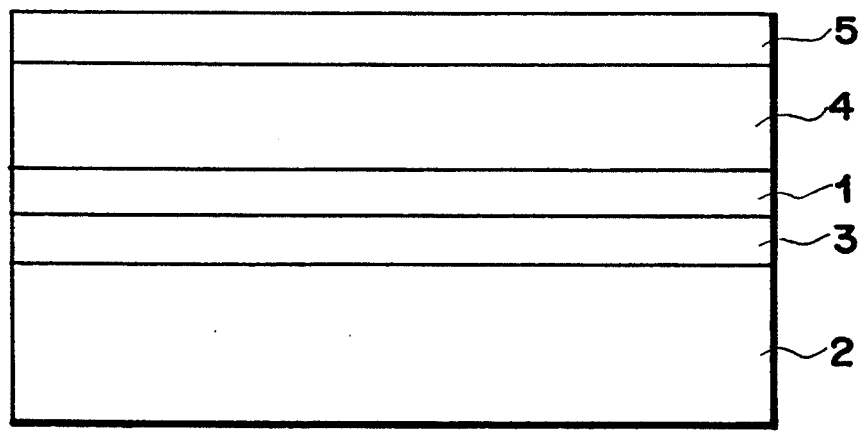
FIG. 2 is a side view of another example of an optical recording medium of the present invention.

In the case where the scavenging layer 1 is provided as illustrated in FIG. 2, the recording layer 3 may either contain or not contain a radical-scavenging compound. When the recording layer 3 in FIG. 2 contains a radical-scavenging compound, the recording layer 3 may be the same as the one described with reference to FIG. 1. The absence of the radical-scavenging compound in the recording layer 3 is preferred to avoid the fall of the reflectance of the recording layer. When the recording layer 3 does not contain a radical-scavenging compound, the content of the organic coloring matter in the recording layer 3 preferably in the range of from 60 to 100%, more preferably from 70 to 100%.

The recording layer 3 and the scavenging layer 1 provided separately may have either distinct interface or no distinct interface. When the interface between the recording layer 3 and the scavenging layer 1 is not distinct, the components of the two layers are intermingled around the interface.

The substrate 2 is preferably made of a light-transmissive material, including acrylic resins, polycarbonate resins, epoxy resins, polyolefin resins, polystyrene resins, and the like. The substrate 2 may have grooves for tracking (not shown in the drawing) on the surface.

The protecting substrate 5, which is optionally provided, may be made of the same material as the substrate 2, the material including acrylic resins, polycarbonate resins, epoxy resins, polyolefin resins, and the like.

The substrate 2 has a thickness preferably in the range of from 0.2 mm to 1.5 mm.

The recording layer 3 has a thickness preferably in the range of from 500 to 2000 Å, more preferably from 700 to 1700 Å whether it contains a radical-scavenging compound or not.

The scavenging layer 1 has a thickness preferably in the range of from 50 to 1500 Å, more preferably from 100 to 1000 Å.

The record-assisting layer 4 has a thickness preferably in the range of from 3 to 50μm, more preferably from 5 to 25 μm.

The protecting substrate 5 has a thickness preferably in the range of from 50 μm to 1 mm.

In the above description, the optical recording medium of the present invention contains a record-assisting compound to scavenge the radicals generated in the record-assisting layer. However, in the case where the elastic polymer constituting the record-assisting compound is formed by ionic polymerization of a polymerizable component, no radical is produced and the radical-scavenging compound need not be contained in the optical recording medium. Thus, in the present invention, the record-assisting layer 4 of the optical recording medium of the present invention may be composed of an elastic polymer formed by ionic polymerization of a polymerizable component.

The polymerizable component used in the ionic polymerization is preferably the one having an epoxy group. The elastic polymer formed by ionic polymerization of the polymerizable component includes silicone rubber, polybutadiene rubber, and the like. The preferred polymerizable component having an epoxy group are, for example, the substances represented by the formulas (5) to (12) below.

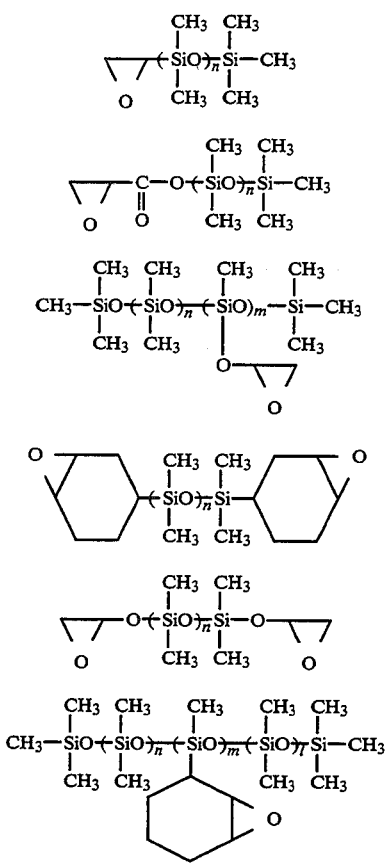

In the formulas, l, m, and n are each an integer.

The polymerizable component having an epoxy group in the present invention is polymerized through ionic polymerization with an ionic polymerization initiator which generates a Lewis acid on ultraviolet ray irradiation. In other words, the record-assisting layer 4 in this embodiment is formed by polymerization of a composition comprising a polymerizable component having an epoxy group and an ionic polymerization initiator. The ionic polymerization is initiated by a Lewis acid generated from an onium salt of the Lewis acid on ultraviolet ray irradiation, and after the irradiation is stopped, the polymerization progresses until the epoxy group is consumed nearly completely.

Any onium salt of a Lewis acid may be used as a catalyst provided that it is capable of releasing a catalyst for initiating the ionic polymerization of a polymerizable component having an epoxy group on ultraviolet ray irradiation. The specific examples includes aromatic diazonium complexes of a halide, aromatic iodonium salt complexes, aromatic sulfonium salt complexes, aromatic ammonium salt complexes, and the like, which are disclosed in Macromolecules, Vol. 10, No. 6, pp. 1307–1315; Photographic Science and Engineering Vol. 18, p. 387, and Japanese Patent Publication Nos. 52-14277, 52-14278, and 52-14279.

Particularly preferred Lewis acid anions of the onium salt include the anions of $BF_4^-$, $PF_6^-$, $AsF_6^-$, $SbF_6^-$, $SbCl_6^-$, $SnCl_6^{2-}$, $FeCl_4^{2-}$, and $BiCl_5^{2-}$. These Lewis acid anions are particularly preferred because the polymerizable component will polymerize rapidly owing to the high activity of the Lewis acid anion released on UV light irradiation or the like, and also because the recording layer is affected little thereby.

The ionic polymerization initiator is employed in the same amount, relative to the epoxy component of the polymerizable component, as in the embodiment described by reference to FIG. 1. In the recording medium of this embodiment, which employs an elastic polymer formed by ionic polymerization of a polymerizable component having an epoxy group, the substrate 2, the recording layer 3, and the protecting layer 5 may be the same as those employed in the aforementioned embodiment described by reference to FIG. 1. In this case, however, a radical-scavenging compound need not be contained in the recording layer 3, and the organic coloring matter is contained preferably in an amount of from 60 to 100% more preferably from 70 to 100% in the recording layer 3. The scavenging layer 1 need not be provided in this case.

In the optical recording medium of the present invention, the recording layer 3 and the scavenging layer 1 may be formed by dissolving or dispersing the aforementioned materials respectively in a solvent and applying sequentially the solutions or dispersions onto the substrate 2.

The solvent for dissolving the materials of the recording layer 3, such as an organic coloring matter and a stabilizing agent, is desired not to attack the substrate 2. Preferred solvents therefor include diacetone alcohol, cellosolve, 1-methoxy-2-propanol, and the like, and mixtures thereof with a small amount of a halogenated solvent. The solvent for dissolving the material of the scavenging layer 1 is desired not to dissolve the recording layer 3, but may slightly dissolve exclusively the surface of the recording layer 3. The solvent for the material of the scavenging layer 1 includes alcohols such as ethanol, isopropyl alcohol, amyl alcohol; cellosolves such as methylcellosolve and ethylcellosolve; n-hexane, benzene, xylene, and the like, depending on the material for the recording layer 3.

The recording layer 3 may also be formed by vapor deposition.

The record-assisting layer 4 may be formed by applying the aforementioned polymerizable component and optionally a polymerization initiator onto the recording layer 3 or the scavenging layer 1 in a desired thickness and subsequently exposing it to, for example, ultraviolet light irradiation. The source of the ultraviolet light is preferably a high-pressure mercury lamp, a metal halide lamp, and the like.

The protecting substrate 5 which is optionally provided may be formed by lamination of a film of the aforementioned material.

The present invention is described more specifically with reference to Examples below.

EXAMPLE 1 to 11

A UV-curable resin (STM401, made by Dainippon Ink and Chemicals Inc.) was filled between an extrusion-molded polycarbonate base plate of 0.4 mm thick and a stamper having predetermined grooves, and was cured by irradiation of a UV ray to provide a substrate having grooves of 3 μm in breadth, 12 μm in pitch, and 3000 Å in depth (according to a so-called 2P process). On the groove face of this substrate, a solution in dichloroethane of the organic coloring matter and the radical-scavenging compound shown in Table 1 was applied by bar coating to provide a recording layer of 1000 Å thick. The concentration of a mixture of the organic coloring matter and the radical-scavenging compound was 2.0%, the mixing ratio thereof being shown in Table 1.

On the recording layer thus provided, the UV-curable silicone rubber was applied in a thickness of 10 μm by roll coating, and subsequently the applied UV-curable silicone rubber was cured by irradiation of an ultraviolet ray from a high-pressure mercury lamp (160 W/cm) from a distance of 15 cm for 30 seconds in a nitrogen atmosphere to form a record-assisting layer.

Further onto the record-assisting layer, a polycarbonate film of 0.3 mm thick was bonded with an ethylene-vinyl acetate copolymer type of hot-melt adhesive (Hirodine 7580, made by Hirodine Kogyo K. K.) by means of a roll laminator at a bonding temperature of 120° C. to provide a protective substrate.

The resulting medium was cut into card-shaped pieces of 85.7 mm in length and 54.0 mm in breadth, thus providing optical cards of the optical recording medium of the present invention.

TABLE 1

| Example | Organic coloring matter {A} | Radical-scavenging compound {B} | Ratio of {A} to {B} (by weight) | Record-assisting layer |
|---|---|---|---|---|
| 1 | [I] | 2,6-di-t-butyl-p-cresol | 10/100 | TFC7870 (made by Toshiba Silicone K.K.) |
| 2 | [I] | 1,1,3-tris-(2-methyl-4-hydroxy-5-t-butylphenyl)butane | 20/100 | TFC7870 (made by Toshiba Silicone K.K.) |
| 3 | [I] | Hydroquinone | 15/100 | TFC7870 (made by Toshiba Silicone K.K.) |
| 4 | [II] | p-methoxyphenol | 20/100 | TUV6020 (made by Toshiba Silicone K.K.) |
| 5 | [II] | 2,6-di-t-butyl-p-cresol | 20/100 | TUV6020 (made by Toshiba Silicone K.K.) |
| 6 | [II] | Butylated hydroxyanisole | 15/100 | TUV6020 (made by Toshiba Silicone K.K.) |
| 7 | [III] | 2,2'-methylene-bis-(4-ethyl-6-t-butylphenol) | 25/100 | X-31-734 (made by Shin-Etsu Silicone K.K.) |
| 8 | [III] | Tocopherol | 15/100 | X-31-734 (made by Shin-Etsu Silicone K.K.) |
| 9 | [III] | p-methoxyphenol | 10/100 | X-31-734 (made by Shin-Etsu Silicone K.K.) |
| 10 | [I] | p-methoxyphenol | 0.5/100 | TFC7870 (made by Toshiba Silicone K.K.) |
| 11 | [III] | 1,1,3-tris-(2-methyl-4-hydroxy-5-t-butylphenyl)butane | 40/100 | X-31-734 (made by Shin-Etsu Silicone K.K.) |

The organic coloring matters [I], [II], and [III] in Table 1 are represented by the formulas below.

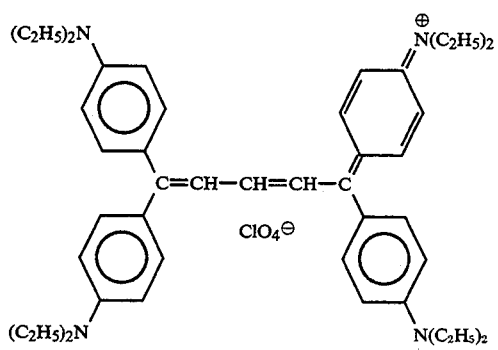
[I]

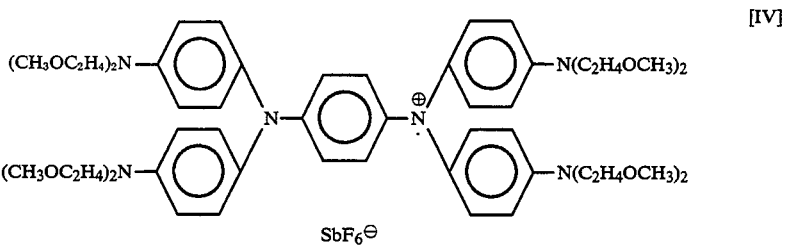
[IV]

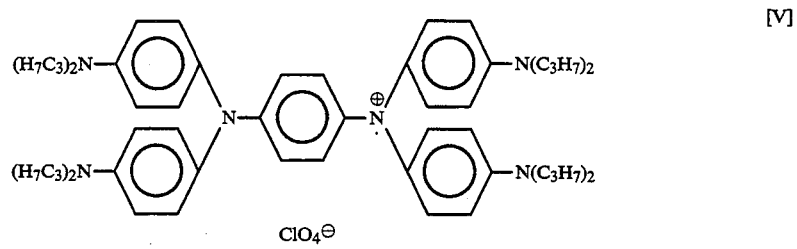
[V]

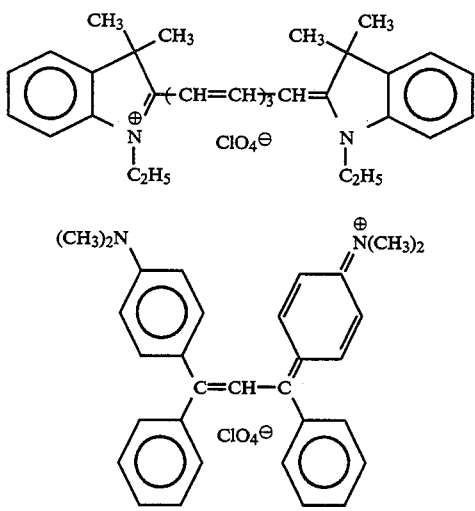
[II]
[III]

EXAMPLES 12 to 17

The substrate employed was the same as the one employed in Example 1. The organic coloring matter [I], [II], or [III], the radical-scavenging compound, and the stabilizing agent having the structure of the formula [IV] or [V] below were dissolved in dichloroethane, and the resulting solution was applied onto the face of the grooves of the substrate by bar coating to provide a recording layer of 1000 Å thick.

The concentration of a mixture of the organic coloring matter, the radical-scavenging compound, and the stabilizing agent in the dichloroethane solution was 2.0%. The mixing ratios of the radical-scavenging compound and the stabilizing agent to the organic coloring matter are shown in Table 2.

On the recording layer thus formed, a record-assisting layer was formed out of a UV-curable silicone rubber shown in Table 2 in the same manner as in Example 1.

Further on this record-assisting layer, the same protecting substrate as in Example 1 was provided. Finally the resulting recording medium was cut into pieces in the same manner as in Example 1 to prepare optical cards of the present invention.

TABLE 2

| Example | Organic coloring matter {A} | Stabilizing agent {C} | Ratio of {A} to {C} (by weight) | Radical-scavenging compound | Ratio of {B} to {A} (by weight) | Record-assisting layer |
|---|---|---|---|---|---|---|
| 12 | [I] | [IV] | 25/60 | 1,1,3-tris-(2-methyl-4-hydroxy-5-t-butylphenyl)butane | 15/60 | TFC7870 (made by Toshiba Silicone K.K.) |
| 13 | [I] | [IV] | 25/73 | p-methoxyphenol | 2/73 | TFC7870 (made by Toshiba Silicone K.K.) |
| 14 | [II] | [IV] | 25/70 | Hydroxyhydroquinone | 5/70 | TUV6020 |

TABLE 2-continued

| Example | Organic coloring matter {A} | Stabilizing agent {C} | Ratio of {A} to {C} (by weight) | Radical-scavenging compound | Ratio of {B} to {A} (by weight) | Record-assisting layer |
|---|---|---|---|---|---|---|
| 15 | [II] | [IV] | 25/65 | 2,6-di-t-butyl-p-cresol | 10/65 | TUV6020 (made by Toshiba Silicone K.K.) |
| 16 | [III] | [V] | 20/60 | 2,2'-methylene-bis-(4-ethyl-6-t-butylphenol) | 20/60 | X-31-734 (made by Shin-Etsu Silicone K.K.) |
| 17 | [III] | [V] | 20/65 | Stearyl-β-(3,5-di-t-butyl-4-hydroxyphenyl)propionate | 15/65 | X-31-734 (made by Shin-Etsu Silicone K.K.) |

EXAMPLE 18 to 23

Onto the face of the grooves of the same substrate as employed in Example 1, the organic coloring matter [I], [II], or [III], the radical-scavenging compound, and the stabilizing agent of the formula [IV] or [V] described above were applied in the combination and the blending ratios as shown in Table 3 in the same manner as in Example 12, thus forming a recording layer of 1000 Å thick.

On the resulting recording layer, the UV-curable silicone rubber shown in Table 3 was applied. The silicone rubber was heated from the substrate side at 90° C. for 2 minutes prior to the curing by UV ray irradiation.

Subsequently in the same manner as in Example 1, the silicone rubber was cured to form a protecting substrate, and further the resulting recording medium was cut into card-shaped pieces, thereby providing optical cards of the present invention.

coloring matter [I], [II], or [III], and the aforementioned stabilizing agent of the formula [IV] or [V] were dissolved in dichloroethane in the combination and the ratio shown in Table 4, and the solution was applied onto the face of the grooves of the substrate, by bar coating to provide a recording layer of 1000 Å thick. The concentration of a mixture of the organic coloring matter and the stabilizing agent in the dichloroethane solution was 2.0%.

Then, the radical-scavenging compound shown in Table 4 was dissolved or dispersed in xylene at a concentration of 5.0%, and was applied onto the above recording layer to provide a scavenging layer of 300 Å thick.

On the scavenging layer thus formed, a record-assisting layer was formed from a UV-curable silicone rubber shown in Table 4 in the same manner as in Example 1.

Further on this record-assisting layer, the same protecting substrate as in Example 1 was provided. Finally

TABLE 3

| Example | Organic coloring matter {A} | Stabilizing agent {C} | Ratio of {A} to {C} (by weight) | Radical-scavenging compound | Ratio of {B} to {A} (by weight) | Record-assisting layer |
|---|---|---|---|---|---|---|
| 18 | [I] | [IV] | 25/74.5 | Butylated hydroxyanisole | 0.5/74.5 | TFC7870 (made by Toshiba Silicone K.K.) |
| 19 | [I] | [IV] | 25/70 | p-methoxyphenol | 5/70 | TFC7870 (made by Toshiba Silicone K.K.) |
| 20 | [II] | [IV] | 25/70 | 2,6-di-t-butyl-4-ethylphenol | 5/70 | TUV6020 (made by Toshiba Silicone K.K.) |
| 21 | [II] | [IV] | 25/65 | 2,6-di-t-butyl-p-cresol | 10/65 | TUV6020 (made by Toshiba Silicone K.K.) |
| 22 | [III] | [V] | 20/67 | 2,2'-methylene-bis-(4-ethyl-6-t-butylphenol) | 15/67 | X-31-734 (made by Shin-Etsu Silicone K.K.) |
| 23 | [III] | [V] | 20/78 | Butylated hydroxyanisole | 2/78 | X-31-734 (made by Shin-Etsu Silicone K.K.) |

EXAMPLE 24 to 29

The substrate employed was the same as the one employed in Example 1. The aforementioned organic the resulting recording medium was cut into pieces in the same manner as in Example 1 to prepare optical cards of the present invention.

TABLE 4

| Example | Organic coloring matter {A} | Stabilizing agent {C} | Ratio of {A} to {C} (by weight) | Radical-scavenging compound {B} | Amount of {B} in scavenging layer (%) | Record-assisting layer |
|---|---|---|---|---|---|---|
| 24 | [I] | [IV] | 25/75 | Butylated hydroxyanisole | 100 | TFC7870 (made by Toshiba Silicone K.K.) |
| 25 | [I] | [IV] | 25/75 | p-benzoquione | 100 | TFC7870 |

TABLE 4-continued

| Example | Organic coloring matter {A} | Stabilizing agent {C} | Ratio of {A} to {C} (by weight) | Radical-scavenging compound {B} | Amount of {B} in scavenging layer (%) | Record-assisting layer |
| --- | --- | --- | --- | --- | --- | --- |
| | | | | | | (made by Toshiba Silicone K.K.) |
| 26 | [II] | [IV] | 25/75 | 2,6-di-t-butyl-4-ethylphenol | 100 | TUV6020 (made by Toshiba Silicone K.K.) |
| 27 | [II] | [IV] | 25/75 | 1,1,3-tris-(2-methyl-4-hydroxy 5-t-butylphenyl)-butane | 100 | TUV6020 (made by Toshiba Silicone K.K.) |
| 28 | [III] | [V] | 20/80 | 2,6-di-t-butyl-p-cresole | 100 | X-31-734 (made by Shin-Etsu Silicone K.K.) |
| 29 | [III] | [V] | 20/80 | p-methoxyphenol | 100 | X-31-734 (made by Shin-Etsu Silicone K.K.) |

EXAMPLES 30 to 32

Onto the face of the grooves of the same substrate as the one employed in Example 1, the organic coloring matter [I], [II], or [III], and the stabilizing agent of the formula [IV] or [V] described above were applied in the combination and the blending ratios as shown in Table 5 in the same manner as in Example 24, thus forming a recording layer of 1000 Å thick.

Then, the radical-scavenging compound and the binder was dissolved or dispersed in xylene in the combination and the blending ratio shown in Table 5, and was applied onto the above recording layer to provide a scavenging layer of 1000 Å thick. The concentration of a mixture of the radical-scavenging compound and the binder in the xylene solution was 5.0%

On the scavenging layer thus formed, a record-assisting layer was formed out of a UV-curable silicone rubber shown in Table 5 in the same manner as in Example 1.

Further on this record-assisting layer, the same protecting substrate as the one in Example 1 was provided. Finally the resulting recording medium was cut into pieces in the same manner as in Example 1 to prepare optical cards of the present invention.

EXAMPLES 33 to 42

The substrate employed was the same as the one employed in Example 1. The aforementioned organic coloring matter [I], [II], or [III] was dissolved in dichloroethane in the combination and the ratio shown in Table 6, and the solution was applied onto the face of the grooves of the aforementioned substrate by bar coating to provide a recording layer of 1000 Å thick. The concentration of a mixture of the organic coloring matter and the stabilizing agent in the dichloroethane solution was 2.0%.

Onto the recording layer thus formed, the mixture of the polymerizable component and the ionic polymerization initiator as shown in Table 6 was applied by means of a roll coater in a thickness of 10 μm, and the applied polymerizable component was cured by irradiation of an ultraviolet ray from a high-pressure mercury lamp at 160 w/cm at a distance of 15 cm for 30 seconds, thus forming a record-assisting layer. The mixing ratio of the polymerizable component to the ionic polymerization initiator was 95 to 5 by weight.

Further on this record-assisting layer, the same protecting substrate as the one in Example 1 was provided. Finally the resulting recording medium was cut into pieces in the same manner as in Example 1 to prepare optical cards of the present invention.

TABLE 5

| Example | Organic coloring matter {A} | Stabilizing agent {C} | Ratio of {A} to {C} (by weight) | Radical-scavenging compound {B} | Binder | Amount of {B} in scavenging layer (%) | Record-assisting layer |
| --- | --- | --- | --- | --- | --- | --- | --- |
| 30 | [I] | [IV] | 25/75 | 2,6-di-t-butyl-4-ethylphenol | Polystyrene | 2 | TFC7870 (made by Toshiba Silicone K.K.) |
| 31 | [II] | [IV] | 25/75 | Butylated hydroxyanisole | Ethylene-vinyl acetate copolymer | 5 | TUV6020 (made by Toshiba Silicone K.K.) |
| 32 | [III] | [V] | 20/80 | 2,2'-methylene-bis-(4-ethyl-6-t-butylphenol | polystyrene | 0.1 | X-31-734 (made by Shin-Etsu Silicone K.K.) |

TABLE 6

| Example | Organic coloring matter | Record-assisting layer Polymerizable component | Ionic polymerization initiator |
|---|---|---|---|
| 33 | [I] | $$CH_2\text{—}CH\text{—}CH_2\text{—}O\text{—}(CH_2)_3\text{—}\underset{\underset{CH_3}{\vert}}{\overset{\overset{CH_3}{\vert}}{Si}}O)_{\overline{n}}\underset{\underset{CH_3}{\vert}}{\overset{\overset{CH_3}{\vert}}{Si}}\text{—}CH_2$$ with epoxide on left | $(C_6H_5)_2I^{\oplus}PF_6^{\ominus}$ |
| 34 | [I] | $$CH_2\text{—}CHCH_2O(\underset{\underset{CH_3}{\vert}}{\overset{\overset{CH_3}{\vert}}{Si}}O)_n\text{—}OCH_2CH\text{—}CH_2$$ with epoxides | $(C_6H_5)_2I^{\oplus}PF_6^{\ominus}$ |
| 35 | [I] | " | $4\text{-}NO_2\text{-}C_6H_4\text{-}N_2^{\oplus} \; AsF_6^{\ominus}$ |
| 36 | [I] | $$CH_2\text{—}CH\text{—}CH_2\text{—}O\text{—}(CH_2)_6(\underset{\underset{CH_3}{\vert}}{\overset{\overset{CH_3}{\vert}}{Si}}O)_{\overline{n}}\underset{\underset{CH_3}{\vert}}{\overset{\overset{CH_3}{\vert}}{Si}}\text{—}CH_3$$ | $(C_6H_5)_2I^{\oplus}BF_4^{\ominus}$ |
| 37 | [II] | $$CH_3\text{—}\underset{\underset{CH_3}{\vert}}{\overset{\overset{CH_3}{\vert}}{Si}}\text{—}SiO(SiO)_{\overline{n}}(SiO)_{\overline{m}}Si\text{—}CH_3 \;\; \text{with } CH_2OCH_2CH\text{—}CH_2 \text{ (epoxide)}$$ | $(C_6H_5)_2I^{\oplus}PF_6^{\ominus}$ |
| 38 | [II] | $$\text{(epoxycyclohexyl)}\text{—}CH_2\text{—}C(\text{=}O)\text{—}O\text{—}(\underset{\underset{CH_3}{\vert}}{\overset{\overset{CH_3}{\vert}}{Si}}O)_{\overline{n}}\underset{\underset{CH_3}{\vert}}{\overset{\overset{CH_3}{\vert}}{Si}}\text{—}CH_3$$ | $(C_6H_5)_2I^{\oplus}SbF_6^{\ominus}$ |
| 39 | [II] | $CH_2\text{=}CH\text{—}[(H_2C\text{—}CH\text{=}CH\text{—}CH_2)_x(CH_2\text{—}CH)_y]_n\text{—}O\text{—}CH_2\text{—}CH\text{—}CH_2$ with $CH\text{=}CH_2$ branch and epoxide | $(C_6H_5)_2I^{\oplus}PF_6^{\ominus}$ |

TABLE 6-continued

| Example | Organic coloring matter | Record-assisting layer Polymerizable component | Ionic polymerization initiator |
|---|---|---|---|
| 40 | [III] | $CH_2\underset{O}{\overset{\diagdown\diagup}{-}}CH-CH_2\overset{O}{\overset{\|}{C}}-O-(-SiO-)_{\overline{n}}\underset{CH_3}{\overset{CH_3}{\underset{\|}{\overset{\|}{Si}}}}-CH_3$ with $CH_3$ groups |  $I^{\oplus}SbCl_6^{\ominus}$ |
| 41 | [III] | $CH_2\underset{O}{\overset{\diagdown\diagup}{-}}CH-CH_2-O-(-CH_2-)_{\overline{3}}(-SiO-)_{\overline{n}}\underset{CH_3}{\overset{CH_3}{\underset{\|}{\overset{\|}{Si}}}}-CH_2$ with $CH_3$ groups |  $I^{\oplus}BF_4^{\ominus}$ |
| 42 | [III] | $CH=CH+(H_2C-CH=CH-CH_2)_{\overline{x}}(CH-CH)_{\overline{y}\overline{n}}C_2H_5$ with $\overset{O}{\overset{\diagup\diagdown}{CH-CH_2}}$ and $CH=CH_2$ |  $I^{\oplus}SbF_6^{\ominus}$ |

(Wherein n and m are each an integer; x = 0.6; y = 0.4)

EXAMPLES 43 to 50

A UV-curable resin (STM401, made by Dainippon Ink and Chemicals, Inc.) was filled between an extrusion-molded polycarbonate base plate of 1.2 mm thick and a stamper having predetermined grooves, and was cured by irradiation of a UV ray, to provide a substrate having grooves of 0.6 μm in width, 1.6 μm in pitch, and 0.1 μm in depth (according to a so-called 2P process). On the groove face of this substrate, the organic coloring matter [I], [VI], or [VII] as shown in Table 7 was applied in the same manner as in Example 33 to provide a recording layer of 1000 Å thick.

Onto the recording layer thus formed, a mixture of the polymerizable component and the ionic polymerization initiator was applied in the same manner as in Example 33, and the polymerizable component was cured under the same conditions as in Example 33 to provide a record-assisting layer. The mixing ratio of the polymerizable component to the ionic polymerization initiator was the same as in Example 33.

Further on the record-assisting layer, the same protecting layer as that of Example 1 was provided. Finally, the resulting recording medium was cut into disks of 86 mm in diameter to prepare optical disks of the present invention.

TABLE 7

| Example | Organic coloring matter | Record-assisting layer Polymerizable component | Ionic polymerization initiator |
|---|---|---|---|
| 43 | [I] | $CH_2\underset{O}{\overset{\diagdown\diagup}{-}}CH-CH_2-O-(-CH_2-)_{\overline{3}}(-SiO-)_{\overline{n}}\underset{CH_3}{\overset{CH_3}{\underset{\|}{\overset{\|}{Si}}}}-CH_2$ with $CH_3$ groups |  $I^{\oplus}BF_4^{\ominus}$ |
| 44 | [I] | $\overset{O}{\underset{\diagdown}{\diagup}}\hspace{-2pt}\text{—}CH_2-\overset{O}{\overset{\|}{C}}-O-(-SiO-)_{\overline{n}}\underset{CH_3}{\overset{CH_3}{\underset{\|}{\overset{\|}{Si}}}}-CH_3$ with $CH_3$ groups |  $I^{\oplus}PF_6^{\ominus}$ |

TABLE 7-continued

| Example | Organic coloring matter | Record-assisting layer | |
|---|---|---|---|
| | | Polymerizable component | Ionic polymerization initiator |
| 45 | [I] | " | 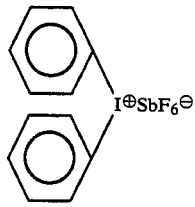 I⊕SbF₆⊖ |
| 46 | [IV] | CH₂—CHCH₂O—(SiO)ₙ—O—CH₂—CH—CH₂ with CH₃ groups on Si and epoxide O groups | 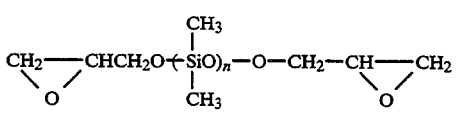 I⊕PF₆⊖ |
| 47 | [VI] | CH₃—Si—SiO—(SiO)ₙ—(SiO)ₘ—Si—CH₃ with CH₃ substituents and CH₂OCH₂CH—CH₂ epoxide | 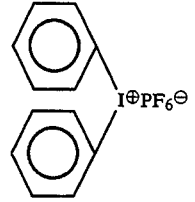 I⊕SbF₆⊖ |
| 48 | [VI] | CH=CH—(H₂C—CH=CH—CH₂)ₓ—(CH₂—CH)ₘ—O—CH₂—CH—CH₂ with CH₂CH₂ and epoxide O | 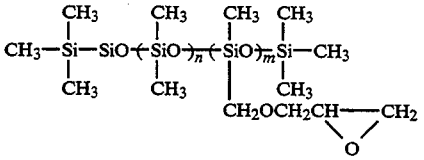 I⊕PF₆⊖ |
| 49 | [VII] | " | 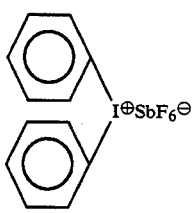 I⊕BF₄⊖ |
| 50 | [VII] | CH₂—CH—CH₂—O—(CH₂)₆—(SiO)ₙ—Si—CH₃ with CH₃ groups and epoxide | 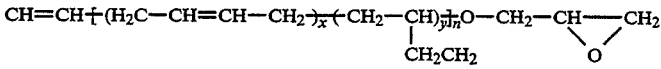 I⊕SbCl₆⊖ |

(Wherein n and m are each an integer)

In Table 7, the organic coloring matter [I] was the one already described, and the organic coloring matters [VI] and [VII] were as shown below.

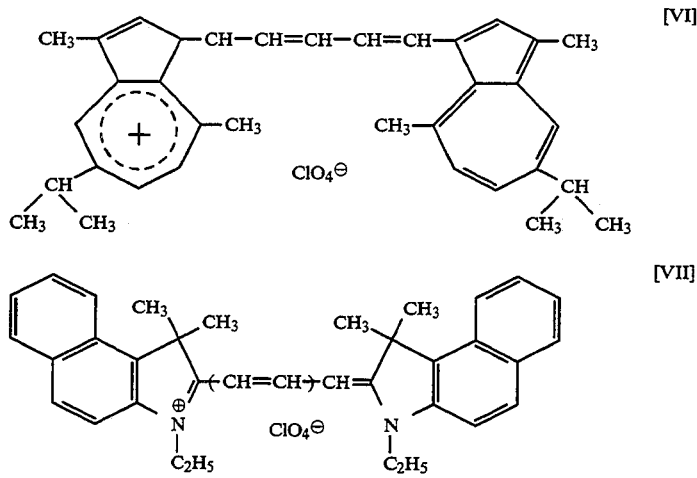

Comparative Examples 1 to 3

The same substrate was employed as the one employed in Example 1. Onto the face of the grooves the organic coloring matter [I], [II], or [III] and the stabilizing agent [IV] or [IV] as mentioned above were applied in the combination and the mixing ratio shown in Table 8 in the same manner as in Example 1 to provide a recording layer of 1000 Å thick. This recording layer contained no radical-scavenging compound.

Onto the recording layer thus formed, a record-assisting layer of the UV-curable silicone rubber shown in Table 8 was provided in the same manner as in Example 1. The UV-curable silicone rubbers shown in Table 8 are curable by a radical chain reaction.

Further thereon, the same protecting substrate as the one in Example 1 was provided. Finally the resulting recording medium was cut in the same manner as in Example 1 to prepare optical cards.

TABLE 8

| Comparative Example | Organic coloring matter {A} | Stabilizing agent {C} | Ratio of {A} to {C} (by weight) | Radical-scavenging compound {B} | Record-assisting layer |
|---|---|---|---|---|---|
| 1 | [I] | [IV] | 25/75 | none | TFC7870 (made by Toshiba Silicone K.K.) |
| 2 | [II] | [IV] | 25/75 | none | TUV6020 (made by Toshiba Silicone K.K.) |
| 3 | [III] | [V] | 20/80 | none | X-31-734 (made by Shin-Etsu Silicone K.K.) |

Comparative Examples 4 to 8

The substrate employed was the same as the one employed in Example 43. Onto the face of the grooves, the organic coloring matter [I], [VI], or [VII] as mentioned above was applied in the same manner as in Example 33 to provide a recording layer of 1000 Å thick. This recording layer contained no radical-scavenging compound.

Onto the recording layer thus formed, a record-assisting layer of the UV-curable silicone rubber shown in Table 9 was provided in the same manner as in Example 1. The UV-curable silicone rubbers shown in Table 9 are curable by a radical chain reaction.

Further thereon, the same protecting substrate as the one in Example 1 was provided. Finally the resulting recording medium was cut in the same manner as in Example 43 to prepare optical disks of 86 mm in diameter.

TABLE 9

| Comparative Example | Organic coloring matter | Record-assisting layer |
|---|---|---|
| 4 | [I] | TUV6001 (made by Toshiba Silicone K.K.) |
| 5 | [VI] | TFC6020 (made by Toshiba Silicone K.K.) |
| 6 | [VI] | X-31-734 (made by Shin-Etsu Silicone K.K.) |
| 7 | [VII] | TFC7770 (made by Toshiba Silicone K.K.) |
| 8 | [VII] | X-31-775 (made by Shin-Etsu Silicone K.K.) |

The optical cards of Examples 1 to 42, the optical disks of Examples of 43 to 50, the optical cards of Comparative Examples 1 to 3, and the optical disks of Comparative Examples 4 to 8 were subjected to measurement of the reflectance at the wavelength of 830 nm by introducing light from the side of the substrate by means of a spectrophotometer U-3400 made by Hitachi, Ltd. The measured reflectances are shown in Tables 10 to 13.

The optical cards of Examples 1 to 42 and Comparative Examples 1 to 3 were tested for recording and reproduction at a feed rate of 0.06 m/sec by use of a semiconductor laser at a wavelength of 830 nm. The recording was conducted at a recording power of 3.5 mW and pulse width of 50 μsec, and the reproduction was conducted with a reproduction power of 0.2 mW. The record-reproduction contrast was calculated from the equation [A] below. The obtained values of the record-reproduction contrast are shown in Table 10 and Table 11.

Record-reproduction contrast = [A]
[(Reflectance of non-recorded portion) −
(Reflectance of recorded portion)]/
(Reflectance of non-recorded portion)

The optical disks of Examples 43 to 50 and Comparative Examples 4 to 8 were tested for recording and reproduction at a rotation rate of 1800 rpm at a wavelength of 830 nm with a semiconductor laser, and the values of C/N were measured. The recording was conducted at a recording power of 8.0 mW at a recording frequency of 3 MHz, and the reproduction was conducted at a reproduction power of 0.5 mW. The obtained C/N values are shown in Table 12 and Table 13.

TABLE 10

| Example | Reflectance (%) | Record-Reproduction contrast |
| --- | --- | --- |
| 1 | 23.5 | 0.68 |
| 2 | 24.0 | 0.70 |
| 3 | 24.3 | 0.67 |
| 4 | 33.7 | 0.65 |
| 5 | 34.5 | 0.66 |
| 6 | 31.9 | 0.62 |
| 7 | 27.1 | 0.59 |
| 8 | 27.8 | 0.60 |
| 9 | 26.9 | 0.63 |
| 10 | 23.0 | 0.60 |
| 11 | 25.8 | 0.58 |
| 12 | 19.1 | 0.58 |
| 13 | 17.4 | 0.52 |
| 14 | 24.7 | 0.53 |
| 15 | 26.6 | 0.56 |
| 16 | 23.5 | 0.54 |
| 17 | 23.2 | 0.52 |
| 18 | 21.0 | 0.61 |
| 19 | 22.5 | 0.64 |
| 20 | 31.2 | 0.61 |
| 21 | 31.7 | 0.60 |
| 22 | 24.4 | 0.61 |
| 23 | 25.6 | 0.60 |
| 24 | 23.9 | 0.69 |
| 25 | 23.6 | 0.67 |
| 26 | 32.5 | 0.64 |
| 27 | 32.8 | 0.65 |
| 28 | 26.3 | 0.64 |
| 29 | 26.5 | 0.62 |
| 30 | 23.2 | 0.69 |
| 31 | 32.0 | 0.62 |
| 32 | 26.0 | 0.60 |
| 33 | 25.1 | 0.67 |
| 34 | 24.7 | 0.63 |
| 35 | 24.5 | 0.61 |
| 36 | 25.0 | 0.66 |
| 37 | 34.3 | 0.70 |
| 38 | 35.0 | 0.68 |
| 39 | 34.7 | 0.61 |
| 40 | 27.9 | 0.60 |
| 41 | 27.5 | 0.59 |
| 42 | 27.6 | 0.57 |

TABLE 11

| Comparative Example | Reflectance (%) | Record-Reproduction contrast |
| --- | --- | --- |
| 1 | 13.2 | 0.35 |
| 2 | 20.7 | 0.42 |
| 3 | 17.9 | 0.38 |

TABLE 12

| Example | Reflectance (%) | C/N |
| --- | --- | --- |
| 43 | 25.0 | 55.7 |
| 44 | 24.7 | 54.2 |
| 45 | 24.8 | 54.3 |
| 46 | 27.9 | 54.3 |
| 47 | 28.2 | 52.4 |
| 48 | 27.8 | 52.7 |
| 49 | 32.7 | 50.8 |
| 50 | 32.9 | 51.4 |

TABLE 13

| Comparative Example | Reflectance (%) | C/N |
| --- | --- | --- |
| 4 | 12.1 | 21.9 |
| 5 | 16.2 | 27.1 |
| 6 | 15.4 | 26.4 |
| 7 | 19.9 | 22.2 |
| 8 | 21.3 | 24.3 |

As is understood from the description above, in the recording medium of an close-adhesion structure having a record-assisting layer, the recording sensitivity of a recording layer of an optical recording medium is maintained high by incorporating a radical-scavenging compound or by employing a record-assisting layer which is curable by ionic polymerization.

The optical recording medium has high recording sensitivity, particularly in the case where a scavenging layer containing a radical-scavenging compound is provided between the recording layer and the record-assisting layer.

Further, the optical recording medium has high recording sensitivity in the case where the radical-scavenging compound in the recording layer is contained in a higher concentration at the record-assisting layer side in the recording layer.

What is claimed is:

1. An optical recording medium having
    a) a substrate,
    b) a recording layer containing an organic coloring matter, and
    c) a sensitivity-improvement layer on the recording layer,
wherein:
    the sensitivity-improvement layer is formed out of an elastic polymer,
    the recording layer contains a radical scavenging compound, and
    the concentration of the radical scavenging compound in the recording layer is higher at the side of the sensitivity-improvement layer than at the side of the substrate.

2. The optical recording medium of claim 1, wherein the radical scavenging compound is selected from the group of phenol compounds, quinone compounds, and amine compounds.

3. The optical recording medium of claim 2, wherein the elastic polymer is silicone rubber.

4. The optical recording medium of claim 1, wherein the radical scavenging compound is contained with the organic coloring matter in a weight ratio of from 1/1000 to 30/100.

5. The optical recording medium of claim 1, wherein the radical scavenging compound is contained with the organic coloring matter in a weight ratio of from 5/10,000 to 20/100.

6. The optical recording medium of claim 5, wherein the radical scavenging compound is contained with the organic coloring matter in a weight ratio of from 5/10,000 to 10/100.

7. An optical recording medium having
   a) a substrate,
   b) a recording layer containing an organic coloring matter, and
   c) a sensitivity-improvement layer on the recording layer,
wherein:
   the sensitivity-improvement layer is formed out of an elastic polymer,
   a scavenging layer containing a radical scavenging compound is provided between the recording layer and the sensitivity-improvement layer,
   the radical scavenging compound is contained in an amount of at least 0.05 wt % in the scavenging layer, and the scavenging layer has a thickness in the range of from 50 to 1,500 Å.

8. The optical recording medium of claim 7, wherein the radical scavenging compound is selected from the group of phenol compounds, quinone compounds, and amine compounds.

9. The optical recording medium of claim 8, wherein the elastic polymer is silicone rubber.

10. The optical recording medium of claim 1 or 7, wherein the organic coloring matter is selected from the group consisting of organic coloring matters represented by the following formulas [I]–[III]:

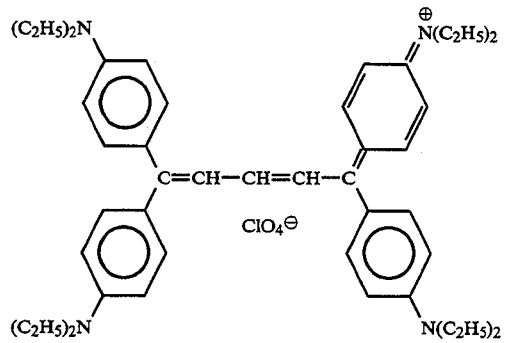

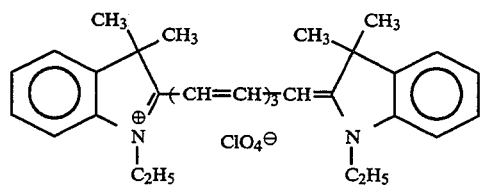

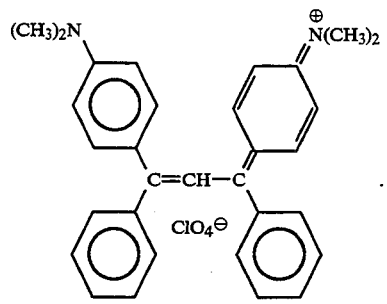

11. An optical recording medium having
   a) a substrate,
   b) a recording layer containing an organic coloring matter, and
   c) a sensitivity-improvement layer on the recording layer, the sensitivity-improvement layer containing a silicone rubber or polybutadiene rubber which is prepared by polymerization of an epoxy-group-containing polymerizable compound with an ionic polymerization initiator, and the epoxy-group-containing polymerizable compound is selected from the group of compounds represented by the following formulas (5) to (12):

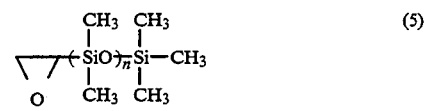

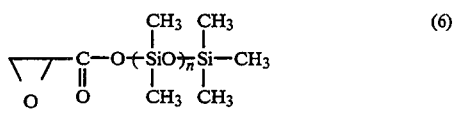

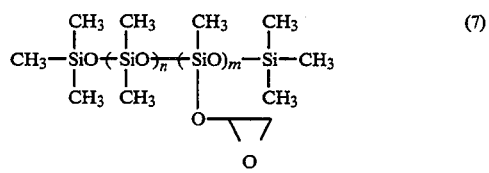

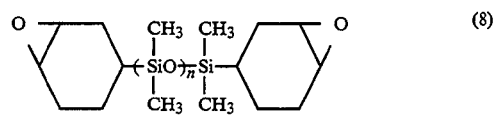

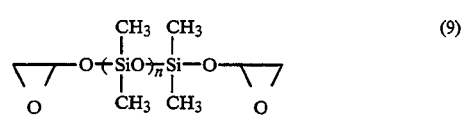

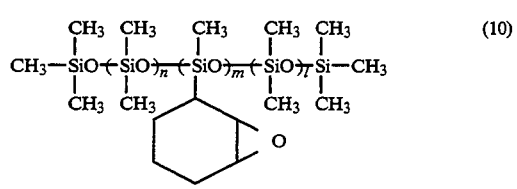

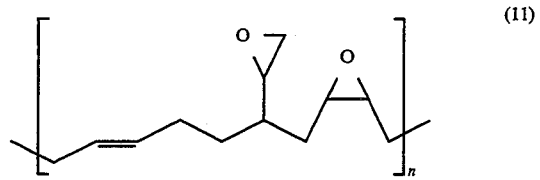

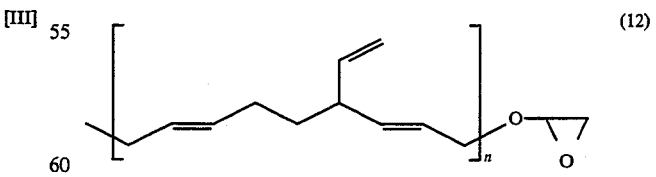

wherein each of l, m, and n is an integer.

12. The optical recording medium of claim 11, wherein the ionic polymerization initiator comprises a compound capable of producing a Lewis acid.

13. The optical recording medium of claim 12, wherein the compound capable of producing the Lewis acid is an onium salt, the anion of which is selected from the group consisting of $BF_4^-$, $PF_6^-$, $AsF_6^-$, $SbF_6^-$, $SbCl_6^-$, $SnCl_6^{2-}$, $FeCl_4^{2-}$, and $BiCl_5^{2-}$.

14. The optical recording medium of claim 11, wherein the rubber contained by the sensitivity-improvement layer is a silicone rubber.

15. The optical recording medium of claim 11, wherein the organic coloring matter is selected from the group consisting of organic coloring matters represented by the following formulas [I], [II], [III], [VI], and [VII]:

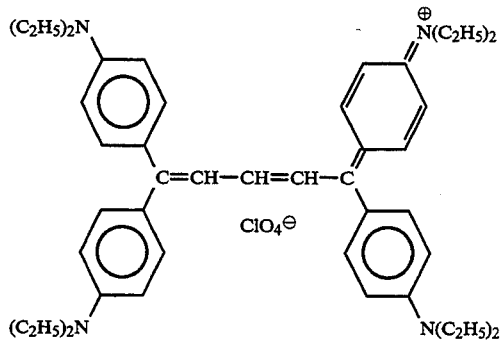

[I]

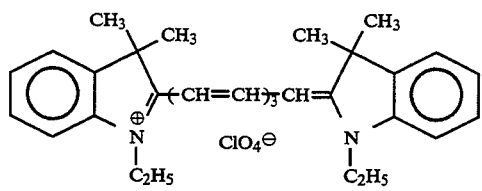

[II]

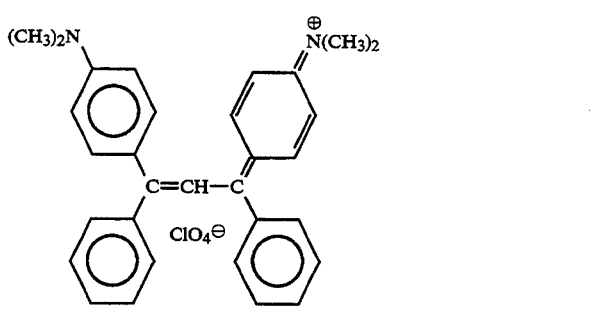

[III]

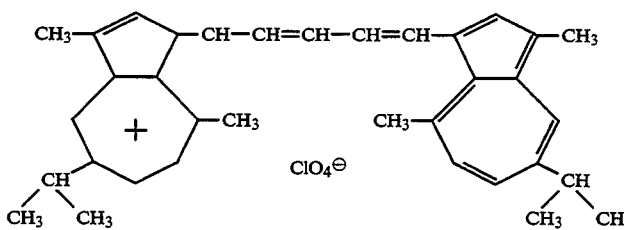

[VI]

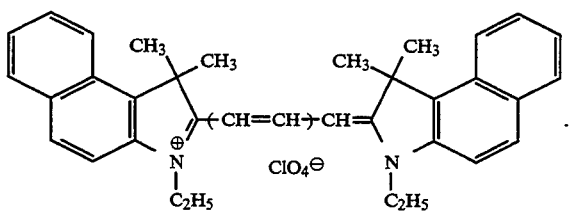

[VII]

16. A process of producing an optical recording medium having a recording layer containing an organic coloring matter and a sensitivity-improvement layer formed out of silicone rubber or polybutadiene rubber, laminated on a substrate, said process comprising the following steps a)–d) of:
   a) preparing the substrate,
   b) applying on the substrate the recording layer containing the coloring matter,
   c) forming on the recording layer a composition layer containing a polymerizable component of silicone rubber or polybutadiene rubber having at least an epoxy group and an ionic polymerization initiator, and
   d) polymerizing the composition layer to form the sensitivity-improvement layer.

17. The process of claim 16, which further comprises, following the step d), a step of sticking a protective layer on the sensitivity-improvement layer.

* * * * *

UNITED STATES PATENT AND TRADEMARK OFFICE
CERTIFICATE OF CORRECTION

PATENT NO. : 5,354,590
DATED : October 11, 1994
INVENTOR(S) : MIKI TAMURA, et al.

It is certified that error appears in the above-indentified patent and that said Letters Patent is hereby corrected as shown below:

ON THE COVER PAGE

[56] References Cited

FOREIGN PATENT DOCUMENTS

"2067179 3/1990 Japan" should read --2-067179 3/1990 Japan-- and
"2121133 5/1990 Japan" should read --2-121133 5/1990 Japan--.

COLUMN 1:
Line 54, "the air gap" should read --of the air gap--.
Line 56, "minimize its thickness" should read --minimize thickness--.

COLUMN 3:
Line 31, "OF" should read --or--.

COLUMN 4:
Line 44, "component" should read --component.--.

COLUMN 7:
Line 31, "component" should read --components--.

COLUMN 9:
Line 61, "EXAMPLE 1 to 11" should read --EXAMPLES 1 to 11--.

COLUMN 13:
Line 16, "EXAMPLE 18 to 23" should read --EXAMPLES 18 to 23--.
Line 57, "EXAMPLE 24 to 29" should read --EXAMPLES 24 to 29--.

UNITED STATES PATENT AND TRADEMARK OFFICE
CERTIFICATE OF CORRECTION

PATENT NO. : 5,354,590
DATED : October 11, 1994
INVENTOR(S) : MIKI TAMURA, et al.

It is certified that error appears in the above-indentified patent and that said Letters Patent is hereby corrected as shown below:

COLUMN 19:
Table 6, Example 41,

"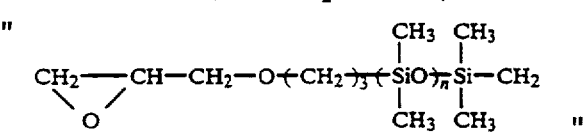"

should read

--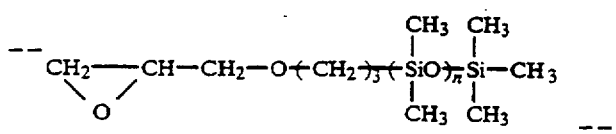--

COLUMN 19:
Table 7, Example 43,

"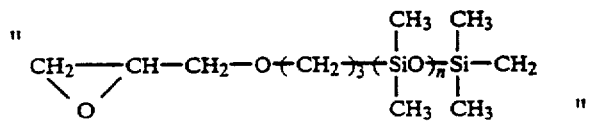"

should read

--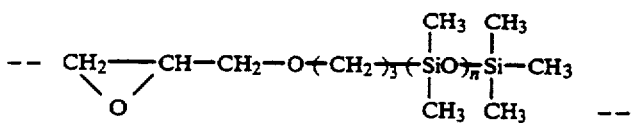--

COLUMN 26:
Line 22, "an close-adhesion" should read
--a close-adhesion--.

UNITED STATES PATENT AND TRADEMARK OFFICE
CERTIFICATE OF CORRECTION

PATENT NO. : 5,354,590
DATED : October 11, 1994
INVENTOR(S) : MIKI TAMURA, et al.

It is certified that error appears in the above-indentified patent and that said Letters Patent is hereby corrected as shown below:

COLUMN 29:

Formula [VI],

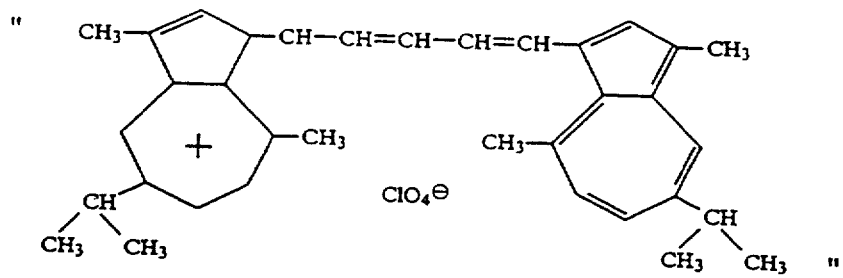

should read

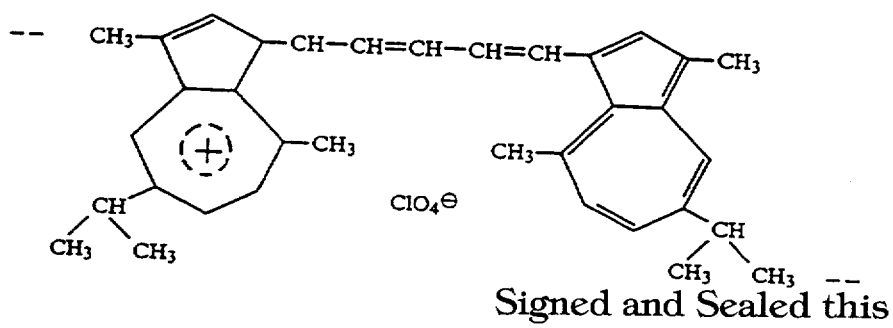

Signed and Sealed this

Eighteenth Day of July, 1995

Attest:

BRUCE LEHMAN

Attesting Officer    Commissioner of Patents and Trademarks